(12) United States Patent
Rehman (10) Patent No.: US 8,996,495 B2
(45) Date of Patent: *Mar. 31, 2015

(54) METHOD AND SYSTEM FOR RANKING SEARCH RESULTS BASED ON CATEGORY DEMAND NORMALIZED USING IMPRESSIONS

(75) Inventor: Muhammad Faisal Rehman, San Jose, CA (US)

(73) Assignee: eBay Inc., San Jose, CA (US)

(*) Notice: Subject to any disclaimer, the term of this patent is extended or adjusted under 35 U.S.C. 154(b) by 123 days.

This patent is subject to a terminal disclaimer.

(21) Appl. No.: 13/027,991

(22) Filed: Feb. 15, 2011

(65) Prior Publication Data

US 2012/0209831 A1 Aug. 16, 2012

(51) Int. Cl.
*G06F 17/30* (2006.01)

(52) U.S. Cl.
CPC ...... *G06F 17/3053* (2013.01); *G06F 17/30873* (2013.01)
USPC ........... 707/706; 707/710; 707/723; 707/736; 707/748

(58) Field of Classification Search
CPC .............. G06F 17/30864; G06F 17/30017; G06F 17/30038; G06F 17/3005; G06F 17/30867; G06F 17/30941; G06F 17/30991
USPC ......... 707/706, 708, 723, 727, 748, 758, 771, 707/710, 736
See application file for complete search history.

(56) References Cited

U.S. PATENT DOCUMENTS

| | | | | |
|---|---|---|---|---|
| 6,606,619 B2 * | 8/2003 | Ortega et al. | ................. | 1/1 |
| 8,037,061 B2 * | 10/2011 | Gates et al. | .................. | 707/722 |
| 8,364,664 B2 * | 1/2013 | Bennett | ........................ | 707/722 |
| 8,473,624 B2 * | 6/2013 | Mart et al. | ..................... | 709/228 |
| 8,549,013 B1 * | 10/2013 | Sarma et al. | .................. | 707/748 |
| 8,688,673 B2 * | 4/2014 | Sarkar | ........................... | 707/706 |
| 2003/0216930 A1 * | 11/2003 | Dunham et al. | ................. | 705/1 |
| 2006/0136589 A1 * | 6/2006 | Konig et al. | .................. | 709/224 |
| 2007/0233671 A1 * | 10/2007 | Oztekin et al. | .................... | 707/5 |
| 2008/0114756 A1 * | 5/2008 | Konig et al. | ......................... | 707/5 |
| 2009/0083222 A1 * | 3/2009 | Craswell et al. | ................... | 707/3 |
| 2010/0057566 A1 * | 3/2010 | Itzhak | ......................... | 705/14.53 |
| 2010/0121842 A1 * | 5/2010 | Klinkott | ........................ | 707/722 |
| 2010/0122178 A1 * | 5/2010 | Konig et al. | ................... | 715/738 |
| 2010/0257167 A1 * | 10/2010 | Liu | ................................ | 707/731 |
| 2011/0093467 A1 * | 4/2011 | Sharp et al. | ..................... | 707/741 |
| 2012/0197651 A1 * | 8/2012 | Robinson et al. | .............. | 705/1.1 |

* cited by examiner

*Primary Examiner* — Hanh Thai
(74) *Attorney, Agent, or Firm* — Schwegman Lundberg & Woessner, P.A.

(57) ABSTRACT

Described herein are methods and systems for promoting item listings that satisfy a query based on the item listings being assigned to certain categories that have, based on historical click data, exhibited high demand characteristics for the query. Consistent with some embodiments, a certain number of leaf-level categories are identified based on demand data for those categories, and the item listings assigned to those categories are promoted through a normalized weighting factor derived in part based on the click probability score associated with the category, clicks per impression rate, and weighted clicks per impression by ranking rate.

21 Claims, 9 Drawing Sheets

METHOD AND SYSTEM FOR RANKING SEARCH RESULTS BASED ON CATEGORY DEMAND NORMALIZED USING IMPRESSIONS

TECHNICAL FIELD

The present disclosure generally relates to data processing systems and techniques. More specifically, the present disclosure relates to methods and systems for ranking a set of search results, based in part on the categories to which an item associated with each search result (e.g., item listing) has been assigned.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come in to existence. The business models utilized by enterprises operating online are almost as varied as the products and services offered. For instance, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, it is well established that the presentation of an item listing in a search results page—for example, the order or placement of the item listing in a list of listings, the font, font size, or color of the listing, and so on—can affect whether potential buyers select the listing, and ultimately purchase the listed product or service.

For enterprises that serve as an intermediary—for example, by connecting buyers with sellers—it is generally desirable that the presentation of item listings occur in a fair manner that strikes a balance between the needs and desires of the various sellers, the buyers or potential buyers, and the enterprise itself. If a preference is given to one seller, such that the one seller's item listings are consistently being presented in the most prominent position(s) on a search results page, other sellers may not participate, which will ultimately have a negative impact on the enterprise. Similarly, if item listings are presented in accordance with an algorithm that is too rigid and that cannot easily be altered or tweaked, such as a first-listed first-presented algorithm, some sellers may attempt to game the system, again negatively impacting other sellers, the potential buyers' experience, and ultimately the enterprise itself. Furthermore, using a simple and rigid algorithm for presenting item listings prevents the enterprise from optimizing the presentation of item listings to improve the overall conversion rate for item listings. This may lead potential buyers to shop elsewhere, which ultimately will negatively affect the e-commerce enterprise. Finally, any algorithm used in the selection and ranking of search results for presentation to a user should accurately present the items for which a potential buyer is searching.

DESCRIPTION OF THE DRAWINGS

Some embodiments are illustrated by way of example and not limitation in the figures of the accompanying drawings, in which.

DETAILED DESCRIPTION

Methods and systems for ranking a set of search results, based in part on the categories to which an item associated with each search result has been assigned are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Described herein are methods and systems for promoting item listings that satisfy a query based on the item listings being assigned to certain categories that have, based on historical click data, exhibited high demand characteristics for the query. In one embodiment, one or more leaf-level categories are identified based on demand data for those categories. The item listings assigned to those categories are promoted through a normalized weighting factor derived in part based on the click probability score associated with the category, clicks per impression rate, weighted clicks per impression by ranking rate.

Figure 1:
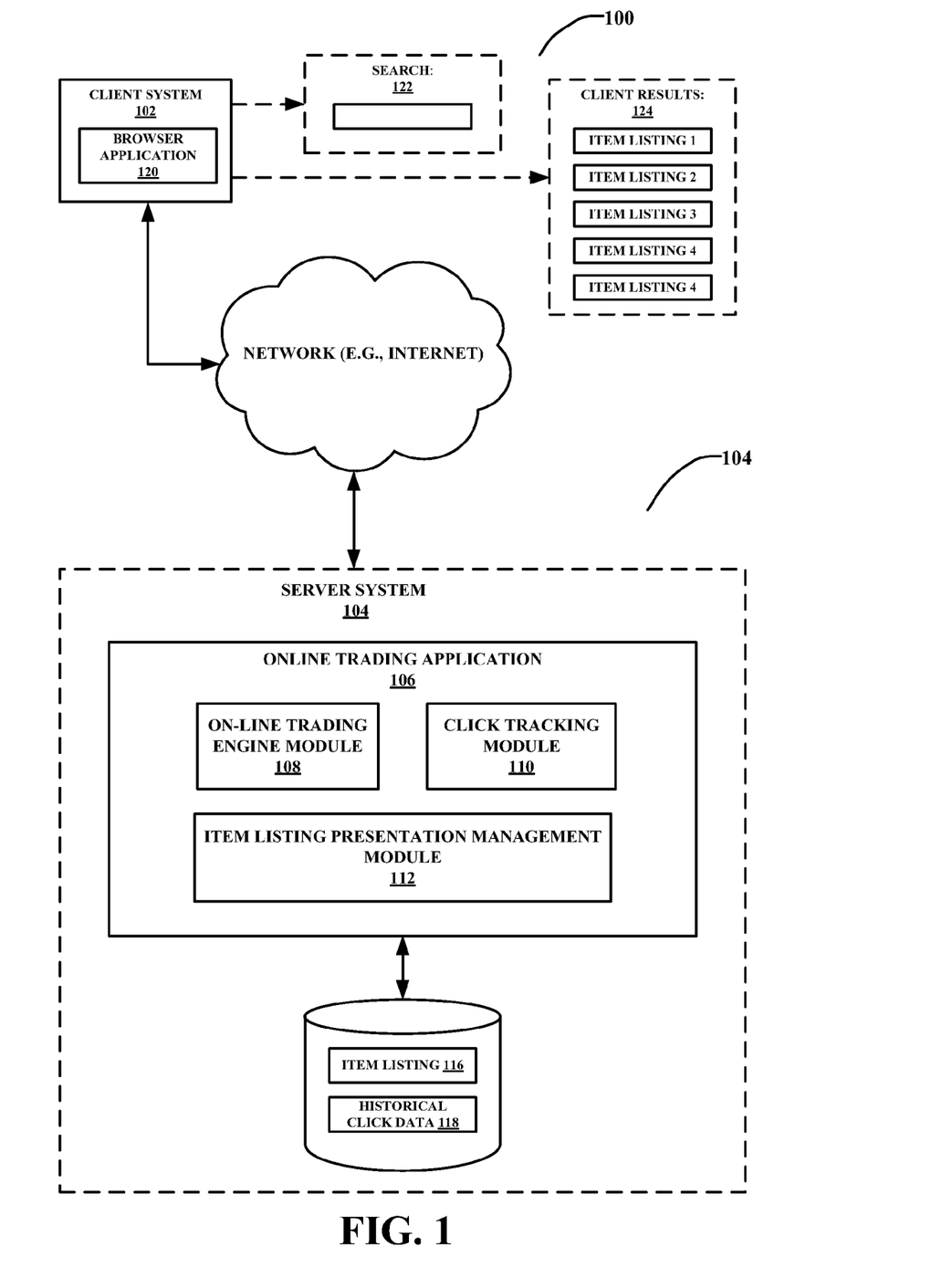
FIG. 1 illustrates a functional block diagram of a network environment for hosting an on-line marketplace or trading application, with which an embodiment of the invention might be implemented.

FIG. 1 illustrates a functional block diagram of a network environment for hosting an on-line marketplace or trading application. In general, the network environment 100 of FIG. 1 includes a client system 102 and a server-based system 104 hosting an on-line trading application 106. As illustrated in FIG. 1, the on-line trading application 106 hosted at the server system 104 is shown to include an on-line trading engine module 108, a click tracking module 110 and an item listing presentation management module 112. Additionally, the on-line trading application is coupled to a database 114 with tables pertaining to item listings 116 and historical click data 118, in addition to other data.

In one embodiment, a user operates a web browser application 120 on a client system 102 to interact with the on-line trading application 106 residing and executing on the server system 104. As illustrated by the example user interface with reference number 120, a user may be presented with a search interface, with which the user can specify one or more search terms to be used in a search request submitted to the on-line trading application 106. In some embodiments, in addition to specifying search terms, users may be able to select certain item attributes, such as the desired color of an item to be searched, and so on. Additionally, in some embodiments, a user may be able to browse items listings by navigating the tree-like hierarchy of categories. In any case, after receiving and processing a search request or category selection (for browsing), the on-line trading application 106 communicates a response to the web browser application 120 on the client system 102. For instance, the response is an Internet document or web page that, when rendered by the browser application 120, displays a search results page 124 showing several item listings that satisfy the user's search request. As illustrated in the example search results page 124, the item listings are arranged or positioned on the search results page in an order determined by the item listing presentation management module 112. The item listings are, in some embodiments, presented by a presentation module, which may be a web server or an application server.

In general, the item listings are presented in the search results page in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner, based on their ranking scores. For instance, instead of using a simple list, in some embodiments the item listings may be presented one item listing per page, or, arranged in some manner other than a top-down list.

Consistent with embodiments of the invention, the ranking score assigned to each item listing is based on one or more component scores or factors, including a normalized category boost score that reflects a likelihood that some item listings assigned to certain categories are likely to be selected, based on an analysis of historical click data, clicks per impression, and weighted clicks per impression by rank. Methods for identifying a predetermined number of categories from which item listings are likely to be selected based on a particular query and deriving a normalized factor (e.g., normalized category boost score) are described in connection with the descriptions of FIGS. 7, 8, and 9.

In some embodiments, the on-line trading engine module 108 may consist of a variety of sub-components or modules, which provide some of the functions of an on-line trading application 106. As described more completely below, each module may be comprised of software instructions, computer hardware components, or a combination of both. To avoid obscuring the invention in unnecessary detail, only a few of the on-line trading engine functions (germane to the invention) are described herein. For example, the on-line trading engine module 108 may include an item listing management module (not shown) that facilitates the receiving and storing of data representing item attributes, which collectively form an item listing. When a user desires to list a single item, or multiple items, for sale, the user will provide information about the item(s) (e.g., item attributes) and how such items are to be presented for sale (e.g., at a fixed price, or via auction, etc.). Such information may be submitted via one or more forms of one or more web pages, or via drop down lists, or similar user interface elements. The item listing management module receives the item attributes and stores the item attributes together within a database 114 as an item listing 116. In some instances, the item listings may be stored in an item listing database table. In general, the item attributes of each item listing are analyzed to determine a ranking score assigned to item listings and used in determining the position of item listings when the item listings are being presented in a search results page.

When an item listing is first generated, the seller of the item will be prompted to assign the item and/or item listing to a particular category. For example, the user may be presented first with a list of top-level categories from which to select the best top-level category for his or her item. Upon selecting a top-level category, the seller may be presented with a list of Level 1 sub-categories from which to select, until the seller has navigated the hierarchical category tree and "drilled down" to select the best leaf-level category for the item being presented via the item listing. In general, the selected category allows potential buyers to identify items by category, for instance, by filtering search results by category, or, by searching or browsing for item listings assigned to a particular category, thereby generally making it easier to identify item listings of interest. The hierarchical category tree is described further in FIG. 4.

The click tracking module 110 operates to identify certain user-initiated events and activities. For instance, the click tracking module 110 identifies when a user "clicks" or otherwise selects an item listing assigned to a particular category. In some embodiments, a selection is identified when a potential buyer clicks on an item listing, or manipulates a cursor device to hover over a particular item listing. If, for example, a potential buyer performs a search with the search terms, "iPod touch", the click tracking module will identify which item listings in the search results page that the potential buyer selects for viewing—such event referred to generally as a "view item" event. The click tracking module 110 will identify the leaf-level category to which a selected item listing is assigned, and keep a tally of the number of times an item listing from each leaf-level category is selected for a particular search query, over a particular time frame. This click data is then stored in a database as illustrated in FIG. 1 by the historical click data with reference number 118. Accordingly, for each subsequent search query that is performed with the same search terms, a click probability score for each category can be ascertained from the historical click data 118. The click probability score for a category indicates the likelihood that an item listing assigned to that category will be selected for that particular search query, based on an analysis of historical click data. As described in greater detail below, the click probability score for the corresponding category to which an item listing is assigned is used to determine whether an item listing should be promoted, for instance, by applying a normalized category boost factor in the algorithm used to assign the item listing a ranking score. The resulting increase in the ranking score will affect the item listing's position in the search results page, thereby "surfacing" the search results that are most likely to be of interest to a potential buyer, given the search term or terms entered by the potential buyer.

Figure 2:
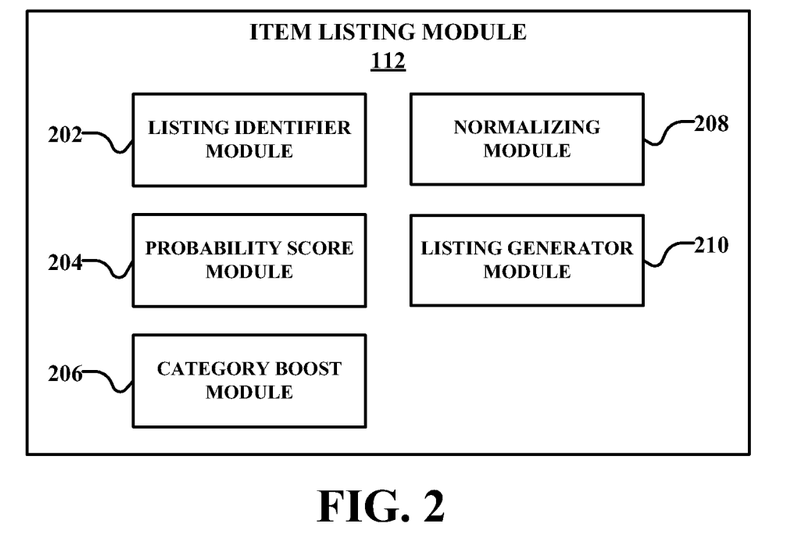
FIG. 2 illustrates a functional block diagram of an embodiment of an item listing presentation management module.

FIG. 2 illustrates one embodiment of an item listing presentation management module 112. The item listing presentation management module 112 provides the logic used to assign a ranking score to item listings that satisfy a search query, and to use the ranking score to determine the order of item listings when the item listings are presented in a search results page. In one embodiment, the item listing presentation management module 112 has a listing identifier module 202, a probability score module 204, a category boost module 206, a normalizing module 208, and a listing generator module 210.

The listing identifier module 202 processes a query to identify a set of item listings where each item listing is associated with an item or service being offered for sale and assigned to a leaf-level category.

The probability score module 204 obtains for the query a click probability score for each leaf-level category to which an item listing satisfying the query has been assigned and identifies up to a predetermined number of leaf-level categories with click probability scores exceeding a threshold score.

The category boost module 206 calculates a category boost score, for each of the identified leaf-level categories, for use in determining the order in which the item listings are to be presented in a search results page. A category boost score or factor is generated for the item listings assigned to those categories. This category boost factor or score is then utilized in the algorithm to generate and assign an overall ranking score to each item listing satisfying the user's search query. Advantageously, this allows item listings that are most likely to be of interest to a potential buyer to be displayed prominently in the search results.

The normalizing module 208 normalizes the category boost score for the identified leaf-level categories. Without the normalizing module 208, the item listing presentation management module 112 runs the risk of generating results that are based on a positive-feedback loop and self-fulfilling behavior. In other words, listings that are on top tend to stay on top because they are more likely to be clicked on when they are on top. The present application attempts to correct such behavior with the normalizing module 208.

The listing generator module 210 presents a search results page with the item listings ordered based in part on the normalized category boost score for the leaf-level category to which each item listing is assigned.

Figure 3A:
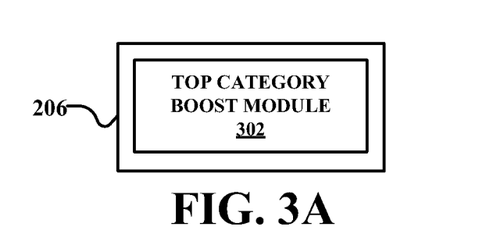
FIG. 3A illustrates a functional block diagram of an embodiment of a normalizing module.

FIG. 3A illustrates one embodiment of the normalizing module 208. The normalizing module 208 includes a constant boost module 302. Instead of applying a dynamic boost factor to individually identified leaf-level categories based on the click probability score associated with the category, a constant boost factor is applied uniformly across several top leaf-level categories irrespective of their corresponding click probability score. In other words, the constant boost factor does not depend on the individual click probability score of each leaf-level category. The computation algorithm of the constant boost module 302 is further described below with respect to FIG. 7.

Figure 3B:
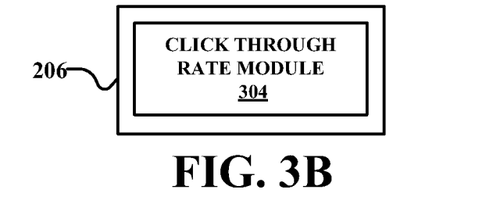
FIG. 3B illustrates a functional block diagram of an embodiment of another normalizing module.

FIG. 3B illustrates another embodiment of the normalizing module 208. The normalizing module 208 includes a click through rate module 304 that computes a dynamic boost factor based on clicks per impression for leaf-categories. In other words, the more clicks per impression, the more likely the category is relevant. As such, leaf-categories with more clicks per impression are more likely to have a high boost factor. The computation algorithm of the click through rate module 304 is further described below with respect to FIG. 8.

Figure 3C:
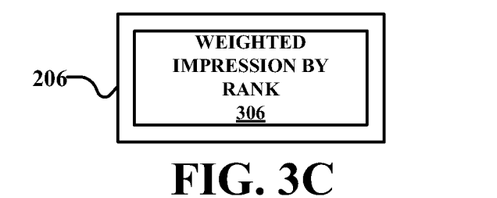
FIG. 3C illustrates a functional block diagram of an embodiment of yet another normalizing module.

FIG. 3C illustrates another embodiment of the normalizing module 208. The normalizing module 208 includes a weighted click through rate module 306 that computes a dynamic boost factor based on weighted impressions by rank for leaf-category, and the respective number of clicks. In other words, the more clicks per impression, the more likely the leaf-category is relevant. Furthermore, clicks for lower ranking items are more relevant than clicks on higher ranking items. The computation algorithm of the weighted click through rate module 306 is further described below with respect to FIG. 9.

Figure 4:
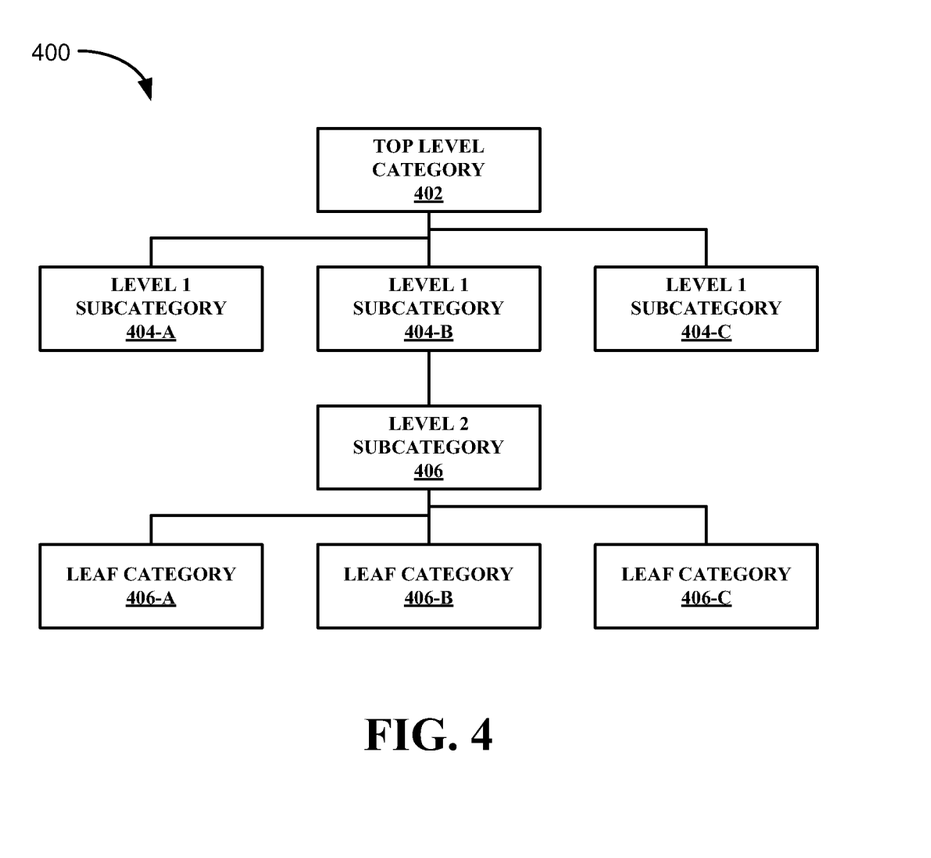
FIG. 4 illustrates an example of a tree-like hierarchy of categories for use with an on-line marketplace or trading application, consistent with some embodiments of the invention.

Consistent with some embodiments of the invention, an online e-commerce or trading platform facilitates transactions between buyers and sellers of goods and services. The trading platform enables a seller to generate an item listing describing the good or service being offered. When the item listing is first generated, the seller selects or otherwise designates a leaf-level category to which the item is assigned. For example, if the item is a portable music player, the seller may select the leaf-level category that best corresponds with portable media players. A leaf-level category is a sub-category of a tree-like hierarchy of categories that does not itself have any additional child sub-categories. For instance, FIG. 4 illustrates an example of a tree-like hierarchy of categories 400, consistent with some embodiments of the invention. As shown in FIG. 4, there is one top-level category 402, which has three direct Level 1 sub-categories 404-A, 404-B and 404-C. Although the tree-like structure 400 may have several top level categories and any number of intermediate level subcategories and leaf-level categories, for purposes of conveying an understanding of the inventive subject matter, the tree-like structure of FIG. 4 is shown to include only one top level category 402, three Level 1 sub-categories 404-A, 404-B and 404-C, one Level 2 subcategory 406 and five individual leaf-level categories 406-A, 406-B, and 406-C.

Consistent with some embodiments of the invention, an online e-commerce or trading platform includes an item listing presentation management module 112 that presents search results (e.g., item listings) in a search results page, such that the search results are ordered based on a ranking score assigned to each search result. The ranking score itself may have several component scores or factors, such that the ranking score for each search result (e.g., item listing) is calculated as the sum of the component scores, or in some cases the product of the various factors. In some embodiments, one component score or factor is a category boost score or factor that, for a particular query, increases the ranking score for item listings that have been assigned to certain sub-categories or leaf-level categories. For instance, if a user enters a particular search term, such as "16 GB iPod Touch", the item listings assigned to certain leaf-level categories are more likely to be selected from the search results page. Accordingly, for the particular search term or terms, the item listings associated with certain categories have their ranking scores boosted, or increased, by inclusion of a category boost score. Continuing with the example search term, "16 GB iPod Touch," item listings assigned to certain leaf-level categories, such as "MP3 Players," are more likely to be selected than item listings assigned to other categories, such as "Accessories." In contrast to some conventional search algorithms which boost or increase the ranking score for all item listings in the dominant top-level category, consistent with some embodiments of the invention, only item listings assigned to the most relevant sub-categories or leaf-level categories, as indicated by an analysis of historical click data, are given a boost or increase to their ranking scores, and thus presented more prominently in the search results page.

Figure 5:
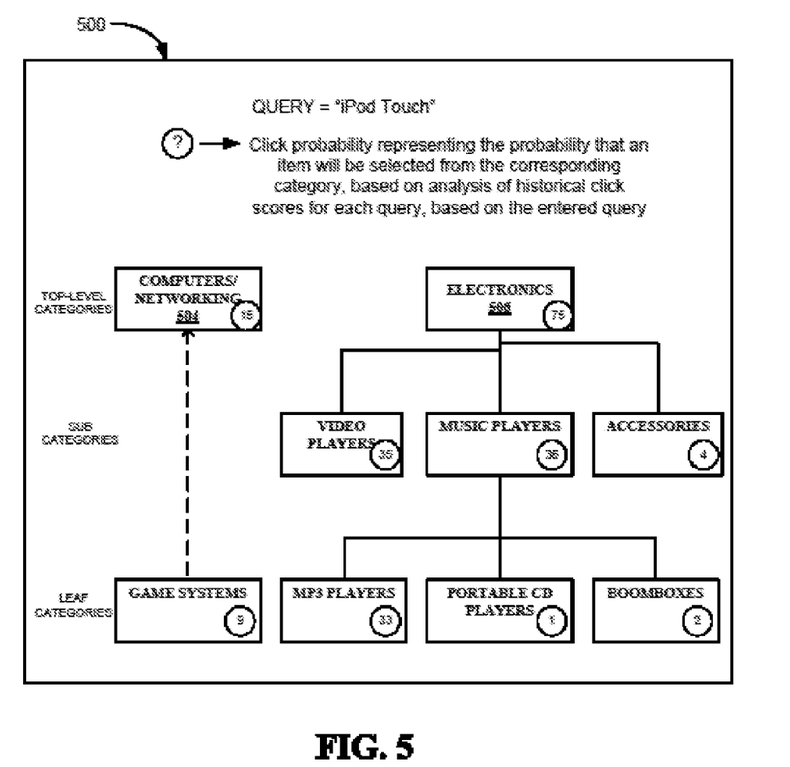
FIG. 5 illustrates an example of a tree-like hierarchy of categories for use with an e-commerce or trading application, and includes for each category a click probability score for a given query, consistent with some embodiments of the invention.

FIG. 5 illustrates an example of a hierarchical tree-like category structure 500 with click probability scores for a particular query 502, consistent with some embodiments of the invention. The hierarchical tree-like structure 500 represents an example of a category structure for use with an online trading or ecommerce platform. As illustrated in FIG. 5, the hierarchical tree-like structure 500 shows categories to which item listings are assigned, and the categories are shown with their corresponding click probability scores for the user-entered query, "iPod Touch." In the example of FIG. 5, not every category to which a click probability score has been assigned is shown. In this example, two top-level categories are shown—"Computers/Networking" 504 and "Electronics" 506. The numbers enclosed in circles represent the click probability scores for the corresponding categories for the particular search query—"iPod Touch." The click probability scores are derived by analyzing historical click data detected and captured via the click tracking module. Accordingly, in the example of FIG. 5, based on historical click data, the probability that a user will select an item listing associated with the leaf-level category "MP3 Players" is thirty-three percent, as compared with the one percent probability that the user will select an item listing in the leaf-level category "Portable CD Players."

In some embodiments, the click tracking module stores raw data, such that the click probability scores need to be computed, in real time when processing a query or when a user is browsing item listings by category. Computing the click probability scores involves dividing the number of clicks (or, events) for a particular category by the total number of all clicks (or, events) for all categories, for the particular query. In some embodiments, the click probability scores are pre-computed on a periodic basis.

In some conventional ranking algorithms, only the top-level category is considered when attempting to identify the most relevant item listings for a given query. However, by selecting item listings in the dominant top-level category (e.g., in this case, "Electronics"), many item listings assigned to leaf-level categories that are not particularly relevant in light of the search terms will be included in the search results. For instance, referring to FIG. 5, for the query, "iPod Touch", presenting in the search results page item listings generally selected from the top-level category, "Electronics," would result in including item listings assigned to leaf-level categories that are typically not relevant—such as, item listings assigned to leaf-level categories, "Portable CD Players" and "Boomboxes." If it turns out that the number of item listings assigned to one of these irrelevant leaf-level categories is significantly greater than the number of item listings in a relevant category, the overall mix of search results is likely to include a significant number of item listings that are not likely to be relevant and thus not likely to be selected by a potential buyer who is viewing the search results. As such, consistent with some embodiments of the invention, the item listings that are assigned to a predetermined number of sub-categories, or leaf-level categories, with the highest click probably score are given a boost to their ranking score by including a category boost factor or score in the algorithm used to assign each item listing a ranking score.

Figure 6:
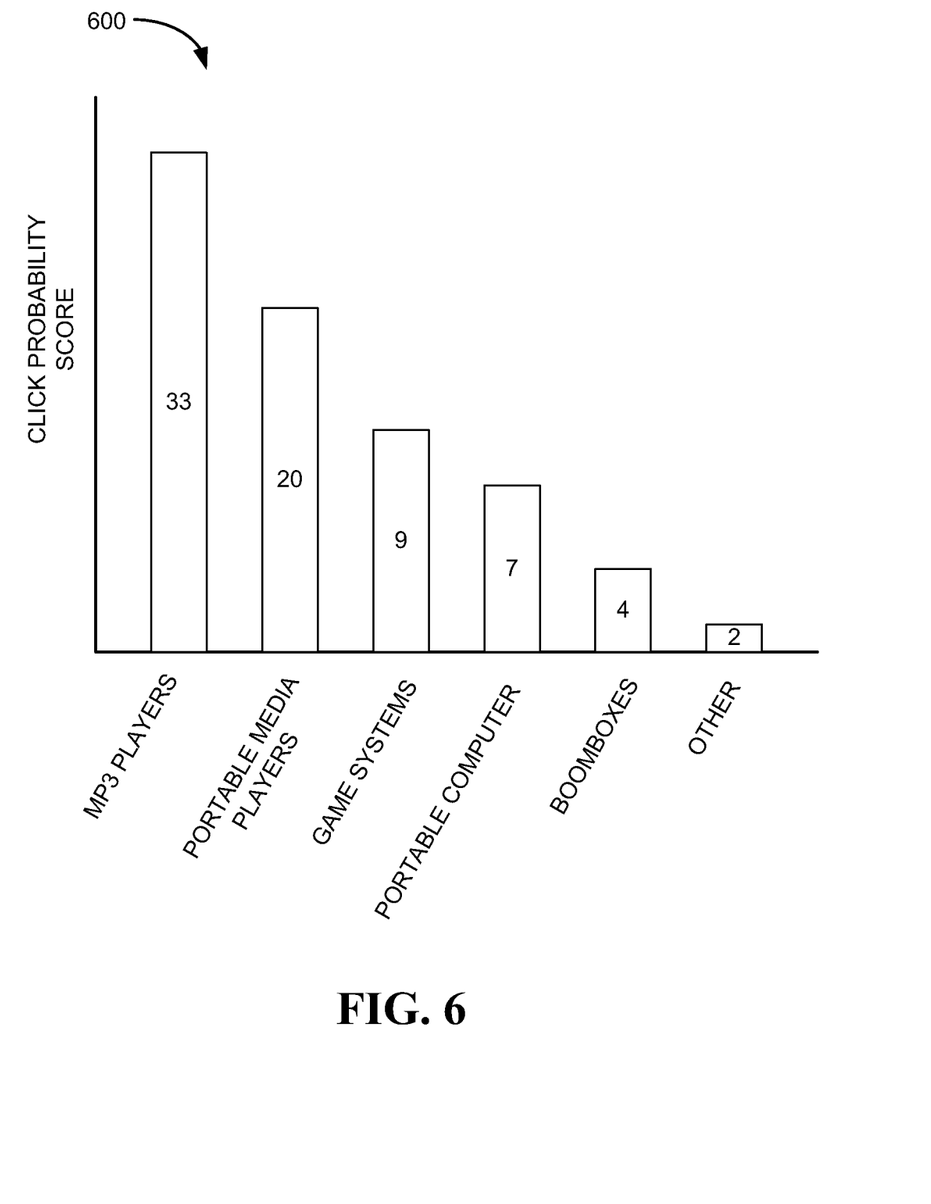
FIG. 6 illustrates the method operations for a method of processing a query and assigning to the search results of the query a category boost score that effects the position of each item listing in the search results page, according to an embodiment of the invention.

FIG. 6 illustrates an example bar chart 600 showing the click probability scores for several categories, for the query, "iPod Touch", consistent with some embodiments of the invention. The click probability scores shown in the bar chart of FIG. 6 are generally consistent with the click probability scores assigned to the categories in the tree-like hierarchy shown in FIG. 5. Accordingly, the category "MP3 PLAYERS" has the highest click probability score for the query "iPod Touch", with a score of thirty-three. The next highest click probability score is associated with the leaf-level category, "PORTABLE MEDIA PLAYERS." Consistent with embodiments of the invention, when item listings are presented to a potential buyer, item listings in a certain predetermined number of categories with high click probability scores are promoted by including in the ranking algorithm a category boost factor.

Figure 7:
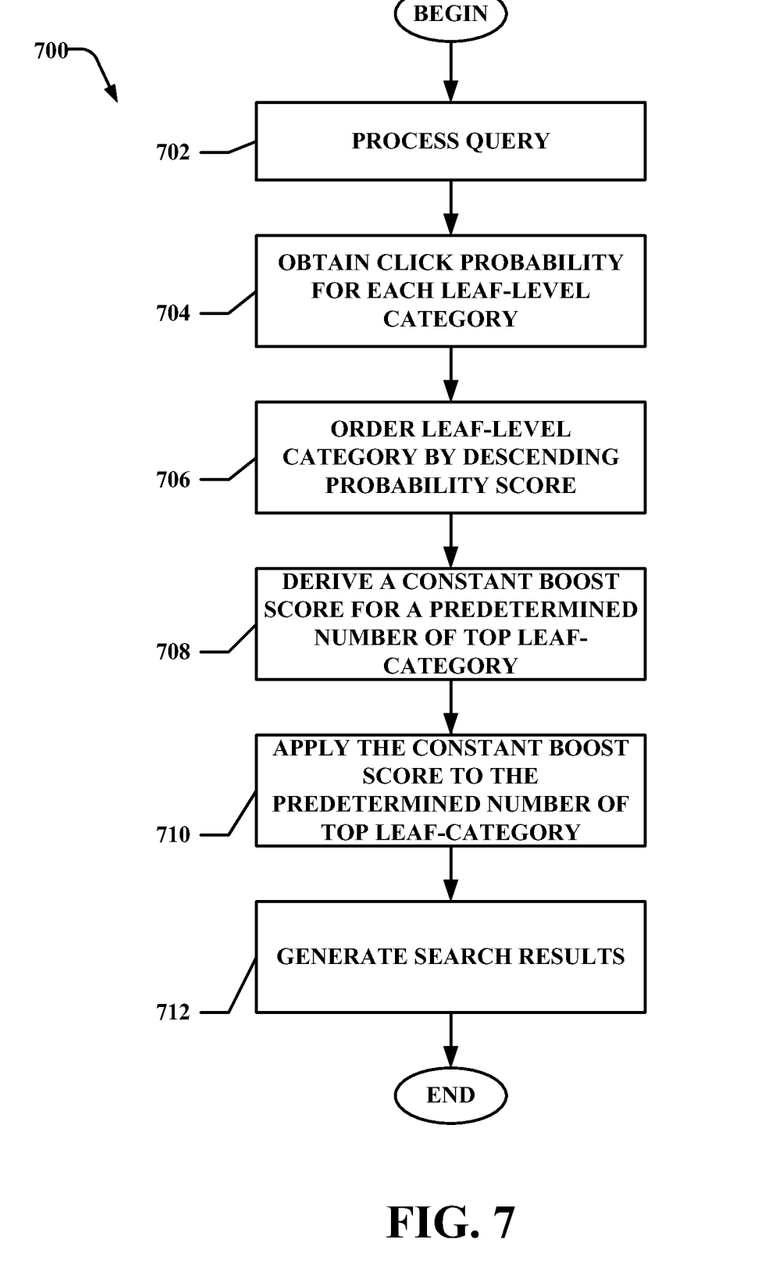
FIG. 7 is a flow diagram illustrating one embodiment of a method for determining the item listings that should be promoted for a given query.

FIG. 7 is a flow diagram illustrating one embodiment of a method for normalizing the category boost score for identified leaf-level categories. The method begins at method operation 702, when a user (e.g., potential buyer) submits a search term or terms for use in a query. The query is processed to identify a set of item listings that satisfy the search terms, where each item listing in the set is assigned to at least one leaf-level category.

Next, at method operation 704, the click probability scores are determined for each leaf-level category to which an item listing satisfying the query is assigned. For example, for each leaf-level category to which an item listing satisfying the query has been assigned, the click probability score is derived. In some embodiments, the click probability scores may be pre-computed on a periodic basis, such that they need only be recalled. In other embodiments, the click probability scores may be calculated in real-time during the processing of a query, or as a user browses item listings by category. In general, the click probability score for a category is derived by dividing the total clicks (or, events) for the category by the total number of clicks (or, events) for all categories under consideration. Once the click probability scores for each leaf-level category are derived, the leaf-level categories are ordered in descending order based on their respective click probability scores at method operation 706.

Once the leaf-level categories are in order based on their respective click probability scores, a predetermined number of leaf-level categories having click probability scores exceeding some predetermined threshold score are identified at method operation 708. For example, in some embodiments, the predetermined number of leaf-level categories to be identified will vary based on the query, or, based on the known dominant categories, or some other factor. In some embodiments, the predetermined threshold score that a click probability score must meet or exceed in order to be included in the list of identified categories and have their associated item listings promoted is a derived value. For example, in some embodiments, the predetermined threshold is derived by dividing the click probability score of the leaf-level category with the highest click probability score by one less than the predetermined number of leaf-level categories to be identified. If, for example, the predetermined number of categories to be identified is five (5), then, using the example presented in FIG. 6, the threshold score would be eight and one quarter (8.25), the result of thirty three (33—the click probability score for MP3 PLAYERS) divided by five (the predetermined number of leaf-level categories to be identified) minus one (5-1). In alternative embodiments, the threshold score may be fixed, or may be derived using any number of alternative algorithms.

If the number of leaf-level categories having click probability scores that meet or exceed the threshold score is equal to or greater than the predetermined number of leaf-level categories to be identified, then the predetermined number of leaf level categories with the highest click probability scores are included in the list of categories that are to have their respective item listings promoted with a category boost score. Accordingly, at method operation 708, a constant boost score or factor for the item listings assigned to one or more identified categories are derived for use in an algorithm for determining a ranking score for each item listing that satisfied the query.

At method operation 710, the same constant boost score or factor is applied to a number of top categories. This same constant category boost score might be used to promote item listings assigned to the particular categories, such that the boost score would serve as a weighting factor to increase the overall ranking score assigned to the respective item listings.

In one embodiment, an equal boost is applied to up to the top five (or any other number of) categories, when demand for the corresponding category is greater than a predetermined percentage. For example, assuming the percentage threshold is 10% for minimum boost and the boost factor is 1.5×, the following categories have the following demands: C1 has a demand of 70%; C2 has a demand of 15%; C3 has a demand of 10%; C4 has a demand of 3%; and C5 has a demand of 2%. In this example, only C1, C2, and C3 will get a boost of 1.5× across the board. In this embodiment, the search results will yield a better diversity from C1, C2, and C3.

In another embodiment, an equal boost is applied to all the top five (or any other number of) categories, regardless of threshold and demand. For example, assuming the boost factor is 1.5×, and the following categories have the following demands: C1 has a demand of 70%; C2 has a demand of 15%; C3 has a demand of 10%; C4 has a demand of 3%; and C5 has a demand of 2%. In this example, C1, C2, C3, C4, and C5 will all get a boost of 1.5×. In this embodiment, the search results will yield a better diversity but with more irrelevant results.

In yet another embodiment, a boost is applied to a category based on its respective demand that meets a certain predetermined threshold. For example, assuming the threshold is 10%, the boost factor is 1.5×, and the following categories have the following demands: C1 has a demand of 70%; C2 has a demand of 15%; C3 has a demand of 10%; C4 has a demand of 3%; and C5 has a demand of 2%. In this example, C1, C2, and C3 will get a boost of up to 1.5× based on their respective demand. In this embodiment, the search results will yield a controlled diversity where the search results include a majority of items from C1, and a few items from C2 and C3.

At method operation 712, the search results are generated and ordered based on the category boost score.

Figure 8:
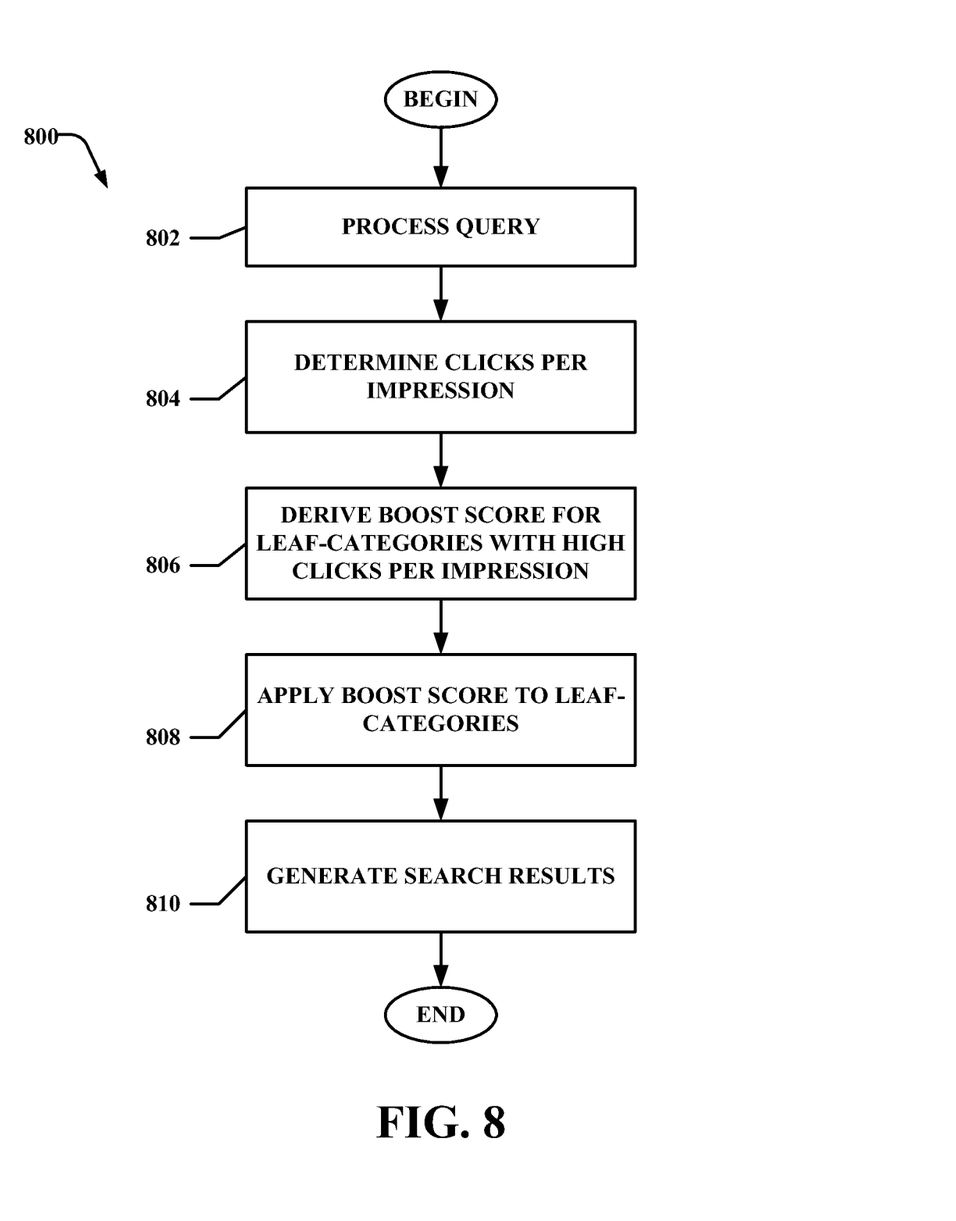
FIG. 8 is a flow diagram illustrating another embodiment of a method for determining the item listings that should be promoted for a given query.

FIG. 8 is a flow diagram illustrating another embodiment of a method for normalizing the category boost score for identified leaf-level categories. The method begins at method operation 802, when a user (e.g., potential buyer) submits a search term or terms for use in a query. The query is processed to identify a set of item listings that satisfy the search terms, where each item listing in the set is assigned to at least one leaf-level category.

At method operation 804, the number of clicks per impression is determined. At method operation 806, the boost score or factor of a category is based on its corresponding click through rate which corresponds to the number of clicks per impression for that category. As such, the higher the clicks per impression for a category, the higher the boost score applied to that category. At method operation 808, the boost score or factor is applied to the respective category. At 810, the search results are generated and ordered based on the dynamic category boost score.

Figure 9:
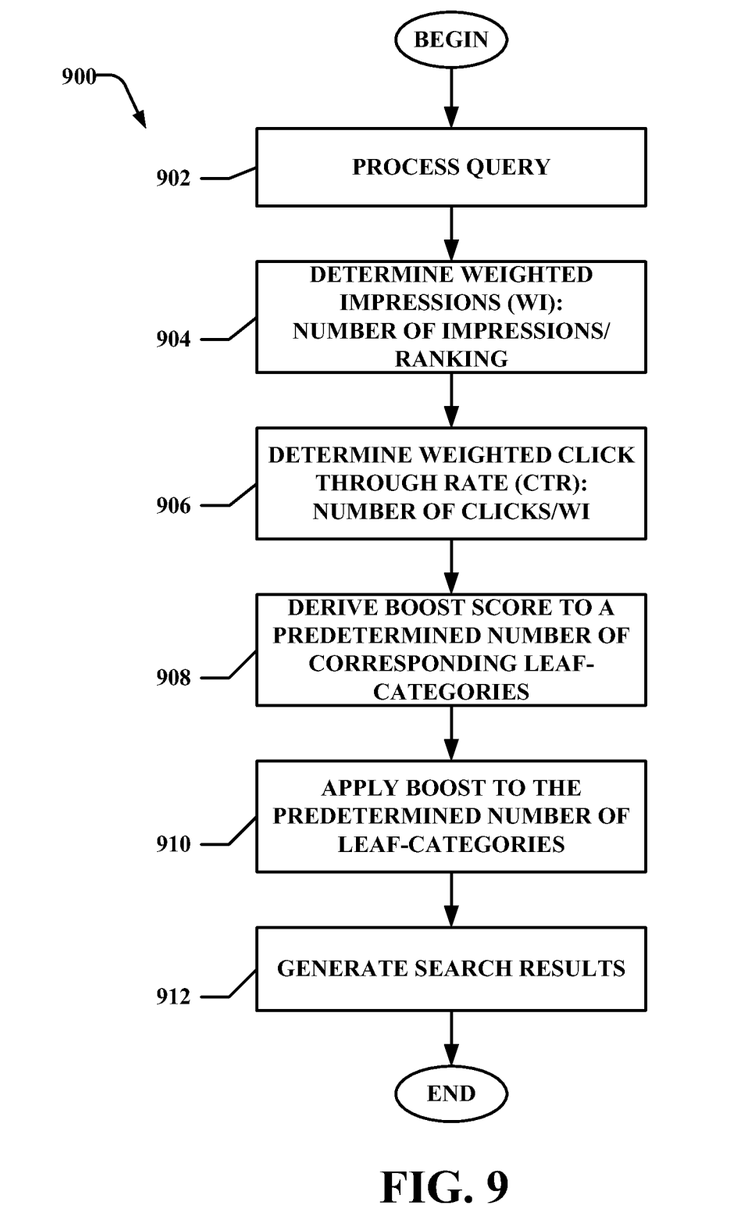
FIG. 9 is a flow diagram illustrating yet another embodiment of a method for determining the item listings that should be promoted for a given query.

FIG. 9 is a flow diagram illustrating another embodiment of a method for normalizing the category boost score for identified leaf-level categories. The method begins at method operation 902, when a user (e.g., potential buyer) submits a search term or terms for use in a query. The query is processed to identify a set of item listings that satisfy the search terms, where each item listing in the set is assigned to at least one leaf-level category.

At method operation 904, the weighted impression by rank is determined by dividing the number of impressions for a listing by the corresponding rank for the listing. At method operation 906, the weighted click through rate is determined by dividing the number of clicks for the listing by the corresponding weighted impression by rank. At method operation 908, the weighted click through rate is used to derive the corresponding boost score of categories. At method operation 910, the boost score or factor is applied to the corresponding categories. At 912, the search results are generated and ordered based on the dynamic weighted category boost score.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 10:
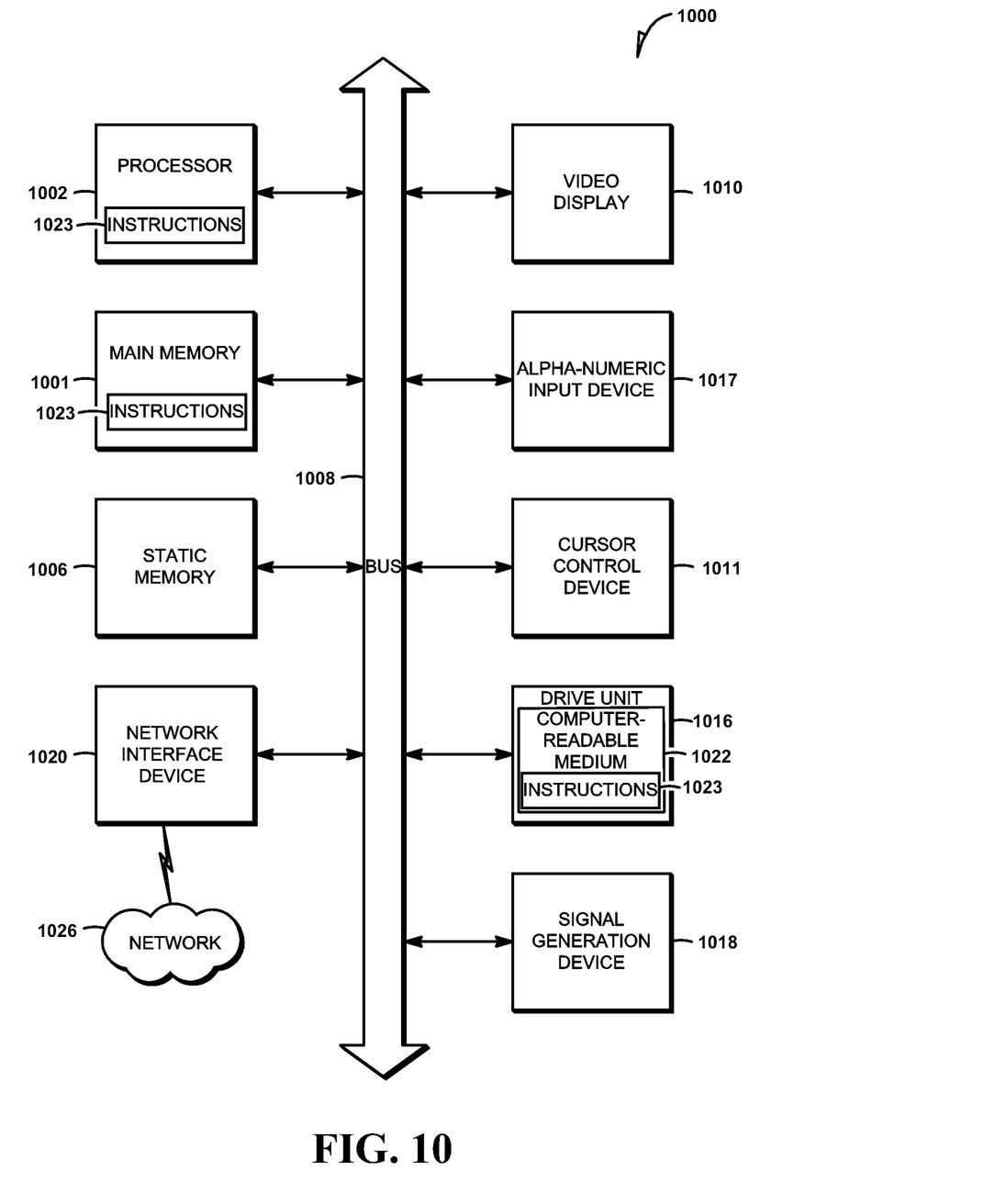
FIG. 10 is a block diagram of a machine in the form of a mobile device within which a set of instructions, for causing the machine to perform any one or more of the methodologies discussed herein, may be executed.

FIG. 10 is a block diagram of a machine in the form of a computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1001 and a static memory 1006, which communicate with each other via a bus 1008. The computer system 1000 may further include a display unit 1010, an alphanumeric input device 1017 (e.g., a keyboard), and a user interface (UI) navigation device 1011 (e.g., a mouse). In one embodiment, the display, input device and cursor control device are a touch screen display. The computer system 1000 may additionally include a storage device (e.g., drive unit 1016), a signal generation device 1018 (e.g., a speaker), a network interface device 1020, and one or more sensors 1021, such as a global positioning system sensor, compass, accelerometer, or other sensor.

The drive unit 1016 includes a machine-readable medium 1022 on which is stored one or more sets of instructions and data structures (e.g., software 1023) embodying or utilized by any one or more of the methodologies or functions described herein. The software 1023 may also reside, completely or at least partially, within the main memory 1001 and/or within the processor 1002 during execution thereof by the computer system 1000, the main memory 1001 and the processor 1002 also constituting machine-readable media.

While the machine-readable medium 1002 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1023 may further be transmitted or received over a communications network 1026 using a transmission medium via the network interface device 1020 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
   processing a query, by a hardware processor of a machine, to identify a set of item listings, each item listing associated with an item or service being offered and assigned to a leaf-level category;
   identifying a leaf-level category for each item listing satisfying the query;
   obtaining for the query a click probability score for each leaf-level category to which an item listing satisfying the query has been assigned;
   identifying up to a predetermined number of leaf-level categories from all leaf-level categories from the set of item listings identified with the query with click probability scores exceeding a same threshold score for all leaf-level categories;
   for each of the identified leaf-level categories, calculating a category boost score for use in determining the order in which the item listings are to be presented in a search results page;
   normalizing the category boost score for one or more identified leaf-level categories; and
   presenting a search results page with the item listings ordered based in part on the normalized category boost score for the leaf-level category to which each item listing is assigned.

2. The computer-implemented method of claim 1, wherein normalizing further comprises:
   calculating a constant boost score for the one or more identified leaf-level categories.

3. The computer-implemented method of claim 1, wherein normalizing further comprises:
   determining a respective number of clicks per impression for each leaf-level category; and
   calculating the normalized category boost score of a leaf-level category based on the respective number of clicks per impression.

4. The computer-implemented method of claim 1, wherein normalizing further comprises:
   determining a weighted impression by rank for each leaf-level category;
   determining a respective weighted number of clicks per impression by rank for each leaf-level category; and calculating the normalized category boost score of each leaf-level category based on the respective weighted number of clicks per impression by rank.

5. The computer-implemented method of claim 1, wherein the threshold score is derived as a percentage of the click probability score of the leaf-level category with a highest click probability score.

6. The computer-implemented method of claim 1, wherein the threshold score is derived by dividing the click probability score of the leaf-level category with a highest click probability score by one less than the predetermined number.

7. The computer-implemented method of claim 1, wherein the category boost score for each identified leaf-level category is derived based in part on the click probability score of each identified leaf-level category.

8. The computer-implemented method of claim 1, wherein the item listings are ordered based on a ranking score derived with an algorithm utilizing the category boost score as a factor.

9. The computer-implemented method of claim 1, wherein the click probability score for each category represents a probability, for a particular query, that an item listing assigned to the category will be selected from a search results page, the click probability score for each category derived based on analysis of historical click data.

10. The computer-implemented method of claim 1, wherein obtaining a click probability score for each leaf-level category to which an item listing satisfying the query has been assigned includes dividing a number of clicks for a particular leaf-level category by the total number of clicks for all leaf-level categories to which an item listing satisfying the query has been assigned.

11. A system for an item listing presentation management, the system comprising:
at least one processor comprising:
a listing identifier module configured to process a query to identify a set of item listings, each item listing associated with an item or service being offered and assigned to a leaf-level category, and to identify a leaf-level category for each item listing satisfying the query;
a probability score module configured to obtain for the query a click probability score for each leaf-level category to which an item listing satisfying the query has been assigned, and identifying up to a predetermined number of leaf-level categories from all leaf-level categories from the set of item listings identified with the query with click probability scores exceeding a same threshold score for all leaf-level categories;
a category boost module configured to calculate a category boost score, for each of the identified leaf-level categories, for use in determining the order in which the item listings are to be presented in a search results page;
a normalizing module, implemented with the least one processor, configured to normalize the category boost score for one or more identified leaf-level categories; and
a listing generator module configured to present a search results page with the item listings ordered based in part on the normalized category boost score for the leaf-level category to which each item listing is assigned.

12. The system of claim 11, wherein the normalizing module comprises:
a constant boost module configured to calculate a constant boost score for the one or more identified leaf-level categories.

13. The system of claim 11, wherein the normalizing module comprises:

a click through rate module configured to determine a respective number of clicks per impression for each leaf-level category, and to calculate the normalized category boost score of a leaf-level category based on the respective number of clicks per impression.

14. The system of claim 11, wherein the normalizing module comprises:
a weight click through rate by rank module configured to determine a weighted impression by rank for each leaf-level category, to determine a respective weighted number of clicks per impression by rank for each leaf-level category, and to calculate the normalized category boost score of each leaf-level category based on the respective weighted number of clicks per impression by rank.

15. The system of claim 11, wherein the item listing presentation management module is to derive the threshold score as a percentage of the click probability score of the leaf-level category with a highest click probability score.

16. The system of claim 11, wherein the item listing presentation management module is to derive the threshold score by dividing the click probability score of the leaf-level category with a highest click probability score by one less than the predetermined number.

17. The system of claim 11, wherein the item listing presentation management module is to derive the category boost score for each identified leaf-level category based in part on the click probability score of each identified leaf-level category.

18. The system of claim 11, wherein the item listing presentation management module is to ordered the item listings based on a ranking score derived with an algorithm utilizing the category boost score as a factor.

19. The system of claim 11, wherein the click probability score for each category represents a probability, for a particular query, that an item listing assigned to the category will be selected from a search results page, the click probability score for each category derived based on analysis of historical click data.

20. The system of claim 11, wherein obtaining a click probability score for each leaf-level category to which an item listing satisfying the query has been assigned includes dividing a number of clicks for a particular leaf-level category by the total number of clicks for all leaf-level categories to which an item listing satisfying the query has been assigned.

21. A non-transitory computer-readable storage medium storing a set of instructions that, when executed by a processor, cause the processor to perform operations, comprising:
processing a query to identify a set of item listings, each item listing associated with an item or service being offered and assigned to a leaf-level category;
identifying a leaf-level category for each item listing satisfying the query;
obtaining for the query a click probability score for each leaf-level category to which an item listing satisfying the query has been assigned;
identifying up to a predetermined number of leaf-level categories from all leaf-level categories from the set of item listings identified with the query with click probability scores exceeding a same threshold score for all leaf-level categories;
for each of the identified leaf-level categories, calculating a category boost score for use in determining the order in which the item listings are to be presented in a search results page;
normalizing the category boost score for one or more identified leaf-level categories; and presenting a search results page with the item listings ordered based in part on the normalized category boost score for the leaf-level category to which each item listing is assigned.

\* \* \* \* \*